(12) United States Patent
Golubic et al.

(10) Patent No.: US 7,465,387 B2
(45) Date of Patent: *Dec. 16, 2008

(54) COAL TAR AND HYDROCARBON MIXTURE PITCH AND THE PREPARATION AND USE THEREOF

(75) Inventors: Thomas A. Golubic, Boardman, OH (US); Kenneth C. Krupinski, Export, PA (US); William E. Saver, Natrona Heights, PA (US); David R. Snyder, Cuyahoga Falls, OH (US); Robert H. Wombles, Gibsonia, PA (US)

(73) Assignee: Koppers Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/388,238

(22) Filed: Mar. 22, 2006

(65) Prior Publication Data

US 2006/0230982 A1 Oct. 19, 2006

Related U.S. Application Data

(63) Continuation of application No. 10/476,017, filed as application No. PCT/US02/14816 on May 9, 2002, now Pat. No. 7,066,997, which is a continuation-in-part of application No. 09/853,372, filed on May 11, 2001, now Pat. No. 7,033,485.

(51) Int. Cl.
  *C10C 3/06* (2006.01)
(52) U.S. Cl. .......................... 208/42; 208/41
(58) Field of Classification Search .............. 106/273.1, 106/282, 284, 285; 188/250 R, 251 R; 244/110 A, 244/110 H; 524/66; 208/22, 39–42, 44; 523/149, 153
See application file for complete search history.

(56) References Cited

U.S. PATENT DOCUMENTS

| | | | |
|---|---|---|---|
| 3,846,362 A * | 11/1974 | Reinecke et al. ............ 524/66 |
| 4,093,479 A | 6/1978 | Baird | |
| 4,175,070 A | 11/1979 | Klein et al. | |
| 4,193,900 A | 3/1980 | Whittington et al. | |
| 4,308,177 A * | 12/1981 | Tucker ..................... 252/507 |
| 4,369,263 A | 1/1983 | Matsushima et al. | |
| 4,466,932 A | 8/1984 | Koyama et al. | |
| 4,476,256 A | 10/1984 | Hammermesh | |
| 4,497,789 A | 2/1985 | Sawran et al. | |
| 4,670,129 A | 6/1987 | Tate et al. | |
| 4,671,864 A | 6/1987 | Sawran et al. | |
| 4,844,740 A | 7/1989 | Chiu | |
| 4,874,564 A * | 10/1989 | Sudani et al. ............. 264/29.7 |
| 4,921,539 A | 5/1990 | Harlin et al. | |
| 4,927,620 A | 5/1990 | Ward et al. | |
| 4,929,404 A | 5/1990 | Takahashi et al. | |
| 4,971,679 A | 11/1990 | Lewis et al. | |
| 5,128,021 A * | 7/1992 | Romey et al. ............... 208/39 |
| 5,182,011 A | 1/1993 | Tsuchitani et al. | |
| 5,217,657 A | 6/1993 | Engle | |
| 5,259,947 A | 11/1993 | Kalback et al. | |
| 5,262,043 A | 11/1993 | Boenigk et al. | |
| 5,334,414 A | 8/1994 | Edie et al. | |
| 5,360,848 A | 11/1994 | Kuechler et al. | |
| 5,413,738 A | 5/1995 | Lewis et al. | |
| 5,429,739 A | 7/1995 | Hanks et al. | |
| 5,433,907 A | 7/1995 | Ogiwara et al. | |
| 5,476,542 A | 12/1995 | Doyle et al. | |
| 5,489,374 A | 2/1996 | Romine et al. | |
| 5,501,729 A | 3/1996 | Lewis et al. | |
| 5,525,558 A | 6/1996 | Niwa et al. | |
| 5,531,943 A | 7/1996 | Sudani et al. | |
| 5,534,133 A | 7/1996 | Lewis et al. | |
| 5,538,621 A | 7/1996 | Kalback et al. | |
| 5,607,770 A | 3/1997 | Lewis et al. | |
| 5,614,164 A | 3/1997 | Sumner et al. | |
| 5,688,155 A | 11/1997 | Lewis et al. | |
| 5,736,030 A | 4/1998 | Tsuchitani et al. | |
| 5,740,593 A | 4/1998 | Sheehan et al. | |
| 5,746,906 A | 5/1998 | McHenry et al. | |
| 5,753,018 A | 5/1998 | Lamport et al. | |
| 5,843,298 A | 12/1998 | Orac et al. | |
| 5,889,081 A | 3/1999 | Kakegawa et al. | |
| 5,910,383 A | 6/1999 | Hase et al. | |

(Continued)

FOREIGN PATENT DOCUMENTS

DE    37 02720 C2    8/1988

(Continued)

OTHER PUBLICATIONS

Aggarwal et al, "Development of preforming pitch . . . " Journal of Materials Science, Nov. 1990, pp. 4604-4606.*

(Continued)

*Primary Examiner*—David M Brunsman
(74) *Attorney, Agent, or Firm*—Reed Smith LLP

(57) ABSTRACT

A method of making a carbon/graphite product using a coal tar pitch having a softening point in the range of about 150° C. to 250° C. Also, a carbon/graphite product having a softening point in the range of about 150° C. to 250° C. A method of making mesophase pitch is formed from quinoline insoluble free coal tar pitch distillate from a high efficiency evaporative distillation process.

1 Claim, 1 Drawing Sheet

U.S. PATENT DOCUMENTS

| | | | |
|---|---|---|---|
| 6,004,370 A | 12/1999 | Takemoto et al. | |
| 6,094,338 A | 7/2000 | Hirahara et al. | |
| 6,129,868 A | 10/2000 | Penkov | |
| 6,231,791 B1 * | 5/2001 | Heine et al. | 264/29.5 |
| 6,231,977 B1 | 5/2001 | Suzuki et al. | |
| 6,237,203 B1 | 5/2001 | Sheehan et al. | |
| 6,267,809 B1 | 7/2001 | Boyer et al. | |
| 6,319,392 B1 | 11/2001 | Navarro | |
| 6,363,098 B1 * | 3/2002 | Hagihara et al. | 373/88 |
| 6,838,162 B1 * | 1/2005 | Gruber et al. | 428/293.4 |
| 7,033,485 B2 * | 4/2006 | Saver et al. | 208/41 |
| 2002/0185411 A1 | 12/2002 | Saver et al. | |

FOREIGN PATENT DOCUMENTS

| | | |
|---|---|---|
| DE | 41 12 955 A1 | 10/1993 |
| EP | 0 957 150 A1 | 11/1999 |
| GB | 1116834 | 6/1968 |
| JP | SHO 52-62329 | 5/1977 |
| JP | SHO 58-132079 | 8/1983 |
| JP | SHO 62-116688 | 5/1987 |
| JP | HEI 2-502648 | 8/1990 |
| JP | HEI 5-125366 | 5/1993 |
| JP | HEI 8-500383 | 1/1996 |

OTHER PUBLICATIONS

Bhatia et al, "A relationship for the evaluation of coking values . . . ", Journal of Materials Science, Oct. 1987, pp. 3847-3850.*

"Polycyclic Aromatic Hydrocarbons (PAH's) in Pitches Used in the Aluminum Industry," A. Mirtchi & L. Noel, pp. 794-795, Carbon '94, Granada, Spain (1994).

* cited by examiner

COAL TAR AND HYDROCARBON MIXTURE PITCH AND THE PREPARATION AND USE THEREOF

CROSS-REFERENCE TO RELATED APPLICATIONS AND PRIORITY CLAIMS

This application is a continuation of pending application Ser. No. 10/476,017(Now U.S. Pat. No. 7,066,997), filed Mar. 25, 2004, which is a national phase application of International Application Serial No. PCT/US02/14816, filed May 9, 2002, which is a continuation-in-part application of pending application Ser. No. 09/853,372 (Now U.S. Pat. No. 7,033,485 filed May 11, 2001.

FIELD OF THE INVENTION

The present invention relates to coal tar pitch or other coal derived streams for the production of coal tar and hydrocarbon mixture pitches and other by-products, and in particular to the production of coal tar hydrocarbon mixture distillates and residues and their uses.

BACKGROUND OF THE INVENTION

Coal tar is a primary by-product material produced during the destructive distillation or carbonization of coal into coke. While the coke product is utilized as a fuel and reagent source in the steel industry, the coal tar material is distilled into a series of fractions, each of which are commercially viable products in their own right. A significant portion of the distilled coal tar material is the pitch residue. This material is utilized in the production of anodes for aluminum smelting, as well as electrodes for electric arc furnaces used in the steel industry. In evaluating the qualitative characteristics of the pitch material, the prior art has been primarily focused on the ability of the coal tar pitch material to provide a suitable binder used in the anode and electrode production processes. Various characteristics such as softening point, specific gravity, percentage of material insoluble in quinoline, also known as QI, and coking value have all served to characterize coal tar pitches for applicability in these various manufacturing processes and industries.

Softening point is the basic measurement utilized to determine the distillation process end point in coal tar pitch production and to establish the mixing, forming or impregnating temperatures in carbon product production. All softening points referred to herein are taken according to the Mettler method or ASTM Standard D3104. Additional characteristics described herein include QI, which is utilized to determine the quantity of solid and high molecular weight material in the pitch. QI may also be referred to as α-resin and the standard test methodology used to determine the QI as a weight percentage include either ASTM Standard D4746 or ASTM Standard D2318. Percentage of material insoluble in toluene, or TI, will also be referred to herein, and is determined through ASTM Standard D4072 or D4312.

Mirtchi and Noel, in a paper presented at Carbon '94 at Granada, Spain, entitled "Polycyclic Aromatic Hydrocarbons in Pitches Used in the Aluminum Industry," described and categorized the PAH content of coal tar pitches. These materials were classified according to their carcinogenic or mutagenic effect on living organisms. The paper identified 14 PAH materials which are considered by the United States Environmental Protection Agency to be potentially harmful to public health. Each of the 14 materials is assigned a relative ranking of carcinogenic potency which is based on a standard arbitrary assignment of a factor of 1 to benzo(a)pyrene or B(a)P. Estimations of potential toxicity of a pitch material may be made by converting its total PAH content into a B(a)P equivalent which eliminates the necessity of referring to each of the 14 materials individually, providing a useful shorthand for the evaluation of a material's toxicity.

A typical coal tar binder pitch is characterized as shown in Table I.

TABLE I

| | |
|---|---|
| Softening Point, ° C. | 111.3 |
| Toluene Insolubles, wt. % | 28.1 |
| Quinoline Insolubles, wt. % | 11.9 |
| Coking Value, Modified Conradson, wt. % | 55.7 |
| Ash, wt. % | 0.21 |
| Specific Gravity, 25/25° C. | 1.33 |
| Sulfur, wt. % | 0.6 |
| B (a) P Equivalent, ppm | 35,000 |

Two shortcomings with respect to the use of coal tar pitch in general, and more specifically in the aluminum industry, have recently emerged. The first is a heightened sensitivity to the environmental impact of this material and its utilization in aluminum smelting anodes. The other is a declining supply of crude coal tar from the coke-making process. Significant reductions in coke consumption, based upon a variety of factors, has reduced the availability of crude coal tar. This reduction in production of these raw materials is expected to escalate in the near future and alternative sources and substitute products have been sought for some period. No commercially attractive substitute for coal tar pitch in the aluminum industry has been developed, however.

There are two traditional methods of distilling coal tar, continuous and batch. Continuous distillation involves a constant feeding of the material to be distilled, i.e., coal tar, and the constant removal of the product or residue, i.e., coal tar pitch. Traditional continuous distillations are typically performed at pressures of between 60 mmHg and 120 mmHg and at temperatures of between 350° C. and 400° C. and are typically able to produce a coal tar pitch having a maximum softening point of approximately 140° C. Batch distillation can be thought of as taking place in a crucible, much like boiling water. High heat levels are developed as a result of the longer residence time of the coal tar in the crucible. Although higher softening points of up to 170° C. can be reached using batch distillation, the combination of high heat and longer residence time can often lead to decomposition of the coal tar pitch and the formation of unwanted mesophase pitch. Processing times for the distillation of coal tar using known continuous and batch distillation range from several minutes to several hours depending upon the coal tar pitch product to be produced.

High efficiency evaporative distillation processes are known that subject a material to elevated temperatures, generally in the range of 300° C. to 450° C., and reduced pressures generally in the range of 5 Torr or less, in a distillation vessel to evolve lower molecular weight, more volatile components from higher molecular weight, less volatile components. Such high efficiency evaporative distillation processes may be carried out using conventional distillation equipment having enhanced vacuum capabilities for operating at the above specified temperature and pressure ranges. In addition, high efficiency evaporative distillation processes may be carried out in an apparatus known as a wiped film evaporator, or WFE, and thus such processes are commonly referred to as WFE processes. Similarly, high efficiency evaporative distillation processes may be carried out in an apparatus known as a thin film evaporator, and thus such processes are commonly referred to as thin film evaporator processes. WFE and thin film evaporator processes are often used as efficient, relatively quick ways to continuously distill a material. Generally, WFE and thin film evaporator processes involve forming a thin layer of a material on a heated surface, typically the interior wall of a vessel or chamber, generally in the range of 300° C. to 450° C., while simultaneously providing a reduced pressure, generally in the range of 5 Torr or less. In a WFE process, the thin layer of material is formed by a rotor in close proximity with the interior wall of the vessel. In contrast, in a thin film evaporator process, the thin film evaporator typically has a spinner configuration such that the thin layer of material is formed on the interior wall of the vessel as a result of centrifugal force. WFE and thin film evaporator processes are continuous processes as they involve the continuous ingress of feed material and egress of output material. Both wiped film evaporators and thin film evaporators are well known in the prior art.

One prior art WFE apparatus is described in Baird, U.S. Pat. No. 4,093,479. The apparatus described in Baird includes a cylindrical processing chamber or vessel. The processing chamber is surrounded by a temperature control jacket adapted to introduce a heat exchange fluid. The processing chamber includes a feed inlet at one end and a product outlet at the opposite end.

The processing chamber of the apparatus described in Baird also includes a vapor chamber having a vapor outlet. A condenser and a vacuum means may be placed in communication with the vapor outlet to permit condensation of the generated vapor under sub-atmospheric conditions. Extending from one end of the processing chamber to the other end is a tube-like motor-driven rotor. Extending axially outward from the rotor shaft are a plurality of radial rotor blades which are non-symmetrically twisted to extend radially from one end of the chamber to the other between the feed inlet and the product outlet. The rotor blades extend into a small but generally uniform closely spaced thin-film relationship with respect to the interior wall of the processing chamber so that, when the rotor rotates, the rotor blades provide a thin, wiped or turbulent film of the processing material on the interior wall of the processing chamber.

In operation, a material to be processed is introduced into the feed inlet by a pump or by gravity. The material is permitted to move downwardly and is formed into a thin-film on the interior wall of the processing, chamber by the rotating rotor blades. A heat-exchange fluid, such as steam, is introduced into the temperature control jacket so that the interior wall of the processing chamber is heated to a steady, preselected temperature to effect the controlled evaporation of the relatively volatile component of the processing material. A relatively non-volatile material is withdrawn from the product outlet, and the vaporized volatile material is withdrawn from the vapor chamber through the vapor outlet.

One of the major uses of coal tar pitch is as a binder for carbon/graphite products. These products range from anodes for the production of aluminum to fine grain graphite products for use in electric discharge machining. Carbon/graphite products contain two major components petroleum coke and coal tar pitch. Coal tar pitch is the binder that holds the structure together. One of ordinary skill in the art would know that coal tar pitch which has not been cross-linked is inherently graphitizable. The major steps in production of the finished product are mixing, forming, carbonization for carbon products, and carbonization followed by graphitization for graphite products. The major problem experienced with pitch in the process is evolution of volatiles during the carbonization step. Volatiles evolution causes two major problems: 1) emissions of organic compounds, and 2) reduction of the density of the finished baked product. Volatiles emissions are an environmental concern which must be addressed by either capture or destruction of the organic compounds generated. The reduction of the density of the carbon/graphite product results in an inferior product with reduced strength, increased reactivity, and increased electrical resistivity. An advantage therefore exists for carbon/graphite products having low yield of volatiles.

Automobile brakes are produced by binding a number of inorganic and organic substituents with phenolic resin. The process is in certain respects similar to the one discussed for the production of carbon/graphite products above. One of the major problems experienced with automobile brakes is a characteristic called fade. Fade is a reduction of the friction characteristics of the friction material when it becomes hot. Everyone who drives an automobile has experienced fade when the brake is being applied on a downhill grade. As the brake begins to get hot, the driver must push harder on the brake pedal to achieve the same braking capacity. It is believed that fade is caused by the heat instability of the phenolic resin binder of the friction material. As the brake gets hot the phenolic resin begins to decompose resulting in production of a gas layer between the two sliding components. This gas layer causes a loss of friction resulting in the need to push harder on the brake pedal. An advantage therefore exists for brake formulations resulting in a reduction of fade.

Aircraft brakes are produced by carbon impregnation of a carbon fiber preform. The process used for carbon impregnation is called chemical vapor infiltration. Chemical vapor infiltration is performed by coking methane gas in the preform to result in a carbon filled carbon fiber preform. The chemical vapor infiltration process is very time consuming with about 600 hours of processing time required to produce a finished product. An advantage therefore exists for a carbon infiltration process having a reduced time.

Natural rubber is used to produce many of the products we use each day. One rubber product which plays a great part in each of our lives is tires. A tire is produced from a number of different rubber formulations. Different formulations are used to produce the tread, sidewalls, belt coating, and rim. One of the most important characteristics of the different rubber formulations used to produce a tire is the adhesive properties for each of the rubber formulations for each other. An advantage therefore exists for a rubber formulation having increased adhesive properties.

Mesophase pitch is a highly structured pitch which is used in applications where strength or the ability to conduct heat or electricity is important. Significant work has been performed to produce mesophase pitch from coal tar pitch with limited success because of the quinoline insolubles content of the pitch. It has been shown that the quinoline insolubles particles in coal tar pitch hinder coalescence of the mesophase spheres causing a poor quality mesophase to be formed. Known methods of producing mesophase from coal tar pitch involve a filtration or centrifugation step for removing the quinoline insolubles. While these processes work quite well and allow for production of a high quality mesophase, they result in a very high cost of the mesophase product. An advantage therefore exists for a lower cost production of a high quality mesophase.

SUMMARY OF THE INVENTION

The present invention relates to a method of making a high softening point coal tar pitch using high efficiency evaporative distillation, as well as the uses and applications of such pitch. According to the method, a feed coal tar pitch having a softening point in the range of 70° C. to 160° C. is fed into a processing vessel wherein the processing vessel is heated to a temperature in the range of 300° C. to 450° C. and wherein a pressure inside the processing vessel is in the range of 5 Torr or less. An output coal tar pitch is withdrawn from the processing vessel. The output coal tar pitch has a softening point in the range of 140° C. to 300° C. and has less than 5% mesophase. A mesophase content of greater than 5% in the output coal tar pitch will degrade its performance as a binder for carbon-carbon composites, and in the production of graphite electrodes and anodes used for aluminum production. Preferable ranges for the output coal tar pitch include a softening point in the range of 150° C. to 250° C. and less than 1% mesophase. Also, the output coal tar pitch preferably has a B(a)P Equivalent less than or equal to 24,000 ppm. The feed coal tar pitch may preferably have a softening point in the range of 110° C. to 140° C., and the processing vessel may preferably be heated to a temperature in the range of 300° C. to 450° C. The output coal tar pitch may also be combined with a plasticizer such as a low viscosity, preferably between 2 and 5 centistokes at 210° F., low B(a)P equivalent, preferably no more than 5,000 ppm B(a)P, coal tar, or such a coal tar in combination with a petroleum oil where the petroleum oil constitutes 30% to 60% of the mixture.

The present invention also relates to a method of making a mesophase coal tar pitch having 10% to 100% mesophase. According to this method, a feed coal tar pitch having a softening point in the range of 70° C. to 160° C. is fed into a processing vessel, wherein the processing vessel is heated to a temperature in the range of 300° C. to 450° C. and wherein a pressure inside the processing vessel is in the range of 5 Torr or less. A quinoline insoluble-free and ash-free distillate having a softening point in the range of 25° C. to 60° C. is obtained from the processing vessel. The distillate is heat treated at a temperature in the range of 370° C. to 595° C. for between three and eighty hours.

The present invention also relates to a method of making a quinoline insoluble-free and ash-free coal tar pitch. The method includes steps of feeding a feed coal tar pitch having a softening point in the range of 70° C. to 160° C. into a first processing vessel, wherein the first processing vessel is heated to a temperature in the range of 300° C. to 450° C. and wherein a pressure inside the first processing vessel is in the range of 5 Torr or less, obtaining a quinoline insoluble-free and ash-free distillate having a softening point in the range of 25° C. to 60° C. from the first processing vessel, heat treating the distillate at a temperature in the range of 350° C. to 595° C. for between five minutes and forty hours, distilling the heat treated distillate to obtain a pitch having a desired softening point, feeding the pitch having a desired softening point into a second processing vessel, wherein the second processing vessel is heated to a temperature in the range of 300° C. to 450° C., and withdrawing an output coal tar pitch from the second processing vessel. The first and second processing vessel may be the same vessel, or may be different vessels.

Alternatively, a hydrocarbon mixture, such as a mixture of coal tar pitch and petroleum pitch, may be used as a feed material in place of the feed coal tar pitch in each of the methods of the present invention. The hydrocarbon mixture preferably has a coal tar pitch content of at least 50%.

Each of the methods of the present invention may be performed using conventional distillation equipment, a wiped film evaporator, or a thin film evaporator. Conventional distillation is limited to a softening point pitch of 180° C.

Generally, at least one presently preferred embodiment of the present invention broadly contemplates output coal tar pitch having a high softening point greater than 170° C. used as a "modifier" in the formation of carbon/graphite products. The utilization of high softening point pitch product of the present invention addresses the problems associated with evolution of volatiles during production by yielding a lower number of volatiles. The lower volatiles yield means there are fewer organic compounds to capture or destroy, and the product produced has a higher density with resulting superior properties of the finished carbon/graphite product. Also, the high softening point coal tar pitch portion of the resulting carbon/graphite product shrinks thereby improving product density and strength. The resulting product exhibits increased efficiency to conduct heat and electricity.

Further, at least one presently preferred embodiment of the present invention broadly contemplates high softening point coal tar pitch used as a binder in the formation of automobile brakes. The addition of the high softening point pitch product of this invention to brake formulations results in a reduction of fade because the pitch is very stable to high temperatures, therefor it does not decompose and produce the gas bubble responsible for fade.

Further, at least one presently preferred embodiment of the present invention broadly contemplates high softening point coal tar pitch used as a saturant in the formation of aircraft brakes. The saturation of carbon fiber preforms can be performed with the high softening point pitch of the present invention resulting in a 95% saturation of the carbon fiber preform in about one hour. This preliminary quick saturation has the potential to reduce the time necessary for complete carbon saturation of the preform by many hours. Also, dynamometer testing results of the finished aircraft brakes produced using high softening point pitch have shown superior friction characteristics.

Additionally, at least one presently preferred embodiment of the present invention broadly contemplates high softening point coal tar pitch used in the production of rubber products. Rubber formulations containing the pitch of this invention have exhibited superior adhesive properties.

Finally, but not necessarily exclusively, at least one presently preferred embodiment of the present invention broadly contemplates distillate used to make mesophase pitch. The distillate product of this invention is a quinoline insolubles free coal tar derived material which has been shown to produce high quality mesophase. Also, the economics for mesophase production of the present invention result in a product with a much lower cost.

DETAILED DESCRIPTION OF THE PREFERRED EMBODIMENTS

Figure 1:
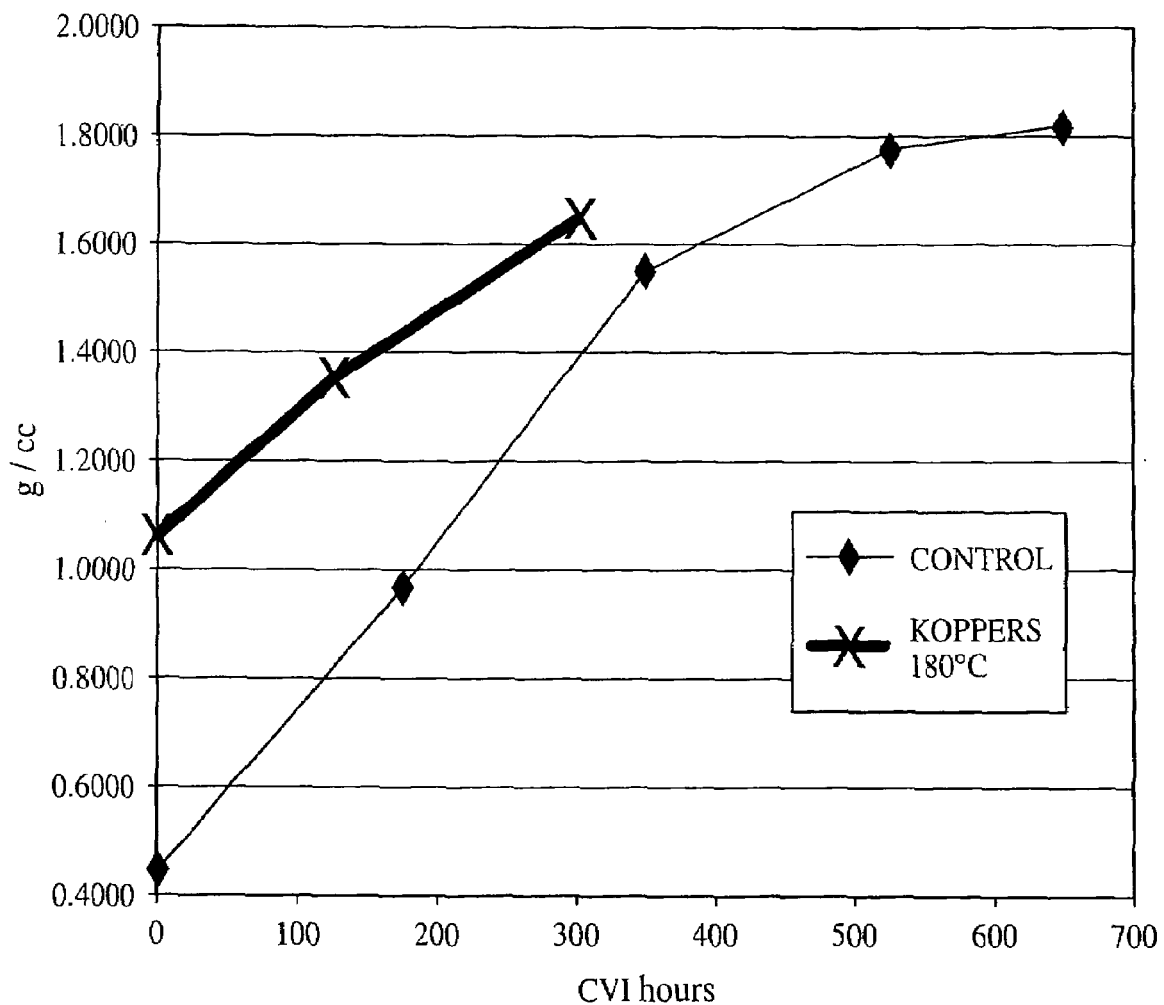
FIG. 1 is a graph showing a density comparison for coal tar pitch saturated carbon fiber preforms.

According to the present invention, a high softening point, low volatility coal tar pitch is produced by processing a feed coal tar pitch having a softening point in the range of 70° C. to 160° C., and preferably in the range of 110° C. to 140° C., using a high efficiency evaporative distillation process carried out in a processing vessel operating at temperatures of 300°

C. to 450° C. and pressures of 5 Torr or less. This temperature range is important because operating below the bottom temperature will not yield the desired softening point in the output material and operating above the top temperature will result in thermal cracking and thermal degradation in the output material. Similarly, this pressure range is important because if the pressure is higher than the specified top range pressure, higher operating temperatures will be necessary to achieve the desired softening point, which higher temperatures will result in thermal cracking and thermal degradation in the output material.

According to the present invention, the processing may be performed using a WFE apparatus, and for purposes of illustration and not limitation, the present invention will be described with respect to processing using a WFE apparatus. It will be appreciated, however, that conventional distillation equipment and conventional thin film evaporators may be used so long as such equipment and evaporators may be operated at the temperatures and pressures described herein. In the case where a thin film evaporator is used, the thin film evaporator preferably should form a film on the interior wall thereof having a minimum thickness that is no smaller than the thickness of the largest QI particle contained in the feed material.

Any known WFE apparatus may be used as long as it is capable of operating at temperatures of 300° C. to 450° C. and pressures of 5 Torr or less. Preferably, the WFE apparatus should be capable of processing a minimum film thickness of 1 millimeter, and operating with a wiper speed of 200 rpm to 3000 rpm. The processing chamber or vessel wall of the WFE is heated to a temperature of between 300° C. and 450° C., and preferably between 300° C. to 400° C. The appropriate feed rate of the feed coal tar pitch into the WFE apparatus will depend on the processing surface area of the vessel. The feed rate should be between 10 and 100 pounds/square foot of surface area/hour, and preferably between 35 and 50 pounds/square foot of surface area/hour. If the feed coal tar pitch is fed into the WFE apparatus at the rate of between 10 and 100 pounds/square foot of surface area/hour, the residence time of the feed coal tar pitch in the WFE apparatus will be approximately 1 to 60 seconds. If the feed coal tar pitch is fed at the preferred rate of between 35 and 50 pounds/square foot/hour, the residence time of the feed coal tar pitch in the WFE apparatus will be approximately 5 to 30 seconds. The residue of the WFE will be an output coal tar pitch having a softening point in the range of 140° C. to 300° C., preferably 150° C. to 250° C., and having a minimal formation of mesophase of 0% to 5%, preferably 0% to 1%. In the case where conventional distillation equipment adapted to operate at the specified temperatures and pressures is used, the output coal tar pitch will have a softening point in the range of 140° C. to 180° C. In order to achieve softening points in the output coal tar pitch in excess of 180° C. according to the present invention, it is necessary to use a WFE or a thin film evaporator, as the residence time required to produce softening points in the output coal tar pitch in excess of 180° C. using a conventional distillation apparatus will yield unwanted results such as the production of excess mesophase. Also, use of a high efficiency evaporative distillation process such as a WFE process facilitates the removal of high boiling point PAH's, particularly benzo(a)pyrene, from the feed coal tar pitch, resulting in an output coal tar pitch having a B(a)P equivalent of no more than 24,000 ppm. The yield of the output coal tar pitch at a given vessel temperature depends on the softening point of the feed coal tar pitch.

EXAMPLE 1

A feed coal tar pitch having, a softening point of 109° C. is fed into a WFE apparatus having a 1.4 square foot vessel operating at a temperature of 335° C., 18.5 mmHg absolute, and at a feed rate of 77 pounds/square foot of surface area/hour. The output coal tar pitch of the WFE apparatus has a pitch yield of 85%. A laboratory analysis of the output coal tar pitch is summarized in the following Table II:

TABLE II

| | |
|---|---|
| Softening Point, ° C. | 140.6 |
| Toluene Insolubles, wt. % | 32.9 |
| Quinoline Insolubles, wt. % | 15.1 |
| Coking Value, Modified Conradson, wt. % | 64.9 |
| Ash, wt. % | 0.20 |
| Specific Gravity, 25/25° C. | 1.35 |
| Beta Resin, wt. % | 17.8 |

EXAMPLE 2

A feed coal tar pitch having a softening point of 109° C. is fed into a WFE apparatus having a 1.4 square foot vessel operating at a temperature of 335° C., 10.4 mmHg absolute, and at a feed rate of 95 pounds/square foot/hour. The output coal tar pitch of the WFE apparatus has a pitch yield of 73%. A laboratory analysis of the output coal tar pitch is summarized in the following Table III:

TABLE III

| | |
|---|---|
| Softening Point, ° C. | 163.0 |
| Toluene Insolubles, wt. % | 37.7 |
| Quinoline Insolubles, wt. % | 17.0 |
| Coking Value, Modified Conradson, wt. % | 71.6 |
| Ash, wt. % | 0.22 |
| Specific Gravity, 25/25° C. | 1.36 |
| Beta Resin, wt. % | 20.7 |

EXAMPLE 3

A feed coal tar pitch having a softening point of 109° C. is fed a WFE apparatus having a 1.4 square foot vessel operating at a temperature of 350° C., 5.0 mmHg absolute and at a feed rate of 65 pounds/square foot/hour. The output coal tar pitch of the WFE apparatus has a pitch yield of 74.2%. A laboratory analysis of the output coal tar pitch is summarized in the following Table IV:

TABLE IV

| | |
|---|---|
| Softening Point, ° C. | 200.0 |
| Toluene Insolubles, wt. % | 42.2 |
| Quinoline Insolubles, wt. % | 18.2 |
| Coking Value, Modified Conradson, wt. % | 76.5 |
| Ash, wt. % | 0.27 |
| Specific Gravity, 25/25° C. | 1.378 |
| Beta Resin, wt. % | 24.1 |

EXAMPLE 4

A feed coal tar pitch having a softening point of 109° C. is fed into a WFE apparatus having a 1.4 square foot vessel operating at a temperature of 365° C., 5.0 mmHg absolute, and at a feed rate of 67 pounds/square foot/hour. The output coal tar pitch of the WFE apparatus has a pitch yield of 67%. A laboratory analysis of the output coal tar pitch is summarized in the following Table V:

TABLE V

| Softening Point, ° C. | 225 |
| Toluene Insolubles, wt. % | 48.9 |
| Quinoline Insolubles, wt. % | 23.3 |
| Coking Value, Modified Conradson, wt. % | 81.2 |
| Ash, wt. % | 0.24 |
| Specific Gravity, 25/25° C. | 1.365 |
| Beta Resin, wt. % | 25.7 |

The output coal tar pitch having a softening point in the range of 140° C. to 300° C., and preferably in the range of 150° C. to 250° C., may be used as a binder for carbon-carbon composites and friction materials, and in the production of graphite electrodes and anodes used for aluminum production. In addition, the output coal tar pitch having a softening, point in the range of 140° C. to 300° C., and preferably in the range of 150° C. to 250° C., may be combined with a plasticizer to produce a pitch having a 110° C. softening point suitable for use in aluminum anode production, including Soderberg binder pitch, and any other industrial application where very low PAH contents are required. The plasticizer may be low viscosity, preferably between 2 and 5 centistokes at 210° F., low B(a)P equivalent, preferably no more than 5,000 ppm B(a)P, coal tar, or such a coal tar in combination with a petroleum oil where the petroleum oil constitutes 30% to 60% of the mixture. One suitable plasticizer is the coal tar pitch blend described in McHenry et al., U.S. Pat. No. 5,746,906, the disclosure of which is incorporated herein by reference.

Alternatively, according to an alternate embodiment of the present invention, a hydrocarbon mixture, such as a mixture of coal tar pitch and petroleum pitch, may be used as a feed material in place of the feed coal tar pitch. The hydrocarbon mixture in this embodiment preferably has a coal tar pitch content of at least 50%. The distillate produced when using a hydrocarbon mixture as the feed material may then be used in the methods described below.

The distillate evolved by processing the feed coal tar pitch in the WFE apparatus will be quinoline insoluble-free, which as used herein means it has a QI in the range of 0% to 0.5%, and ash-free, which as used herein means it has an ash content in the range of 0% to 0.1%. A quinoline insoluble-free, ash free distillate is desirable for at least two reasons. First, the distillate may be used to create materials that will be used as an impregnating pitch to fill in porosity in carbon structures, and it is known that QI and ash hinders the ability to fill in such porosity. Second, the distillate may be used to create mesophase pitch, and QI is known to hinder the coalescence of mesophase spheres. The distillate will comprise a pitch having a softening point in the range of 25° C. to 60° C.

The distillate may be used to produce a quinoline insoluble-free and ash-free pitch of a desired higher softening point by first heat treating the distillate at temperatures between 350° C. and 595° C. for between 5 minutes and 40 hours. The heat treating step may, for example, be performed by placing the distillate in a flask containing a short distillation column, and heating and stirring the distillate therein under a slight vacuum of no more than 600 mmHg Absolute. The step of heat treating the distillate will result in a pitch having a softening point in the range of 60° C. to 110° C. The heat treated distillate may then be distilled by known conventional means to obtain a pitch residue of a desired softening point. The resulting pitch may be used in the production of carbon fibers and fuel cells. As an alternative, a narrow boiling range quinoline insoluble-free pitch may be produced by further processing the quinoline insoluble-free and ash-free pitch produced through heat treating and distillation using a high efficiency evaporative distillation process, such as a WFE or a thin film evaporator process, at temperatures in the range of 300° C. to 450° C. and pressures no greater than 5 Torr, wherein the narrow boiling range pitch is the residue of such processing.

EXAMPLE 5

A 25-30° C. softening point distillate produced from a feed coal tar pitch having a softening point of 110° C. is heat treated at 360° C. for approximately 8 hours to produce a pitch having a softening point of 60° C. The 60° C. softening point pitch is distilled in a batch/pot distillation at an overhead temperature of 400° C. to produce a pitch having a softening point of 98.9° C. with a 70% yield. A laboratory analysis of the resulting pitch is summarized in the following Table VI:

TABLE VI

| Toluene Insolubles, wt. % | 18.3 |
| Quinoline Insolubles, wt. % | 0.5 |
| Coking Value, Modified Conradson, wt. % | 46 |
| Ash, wt. % | 0.04 |
| Specific Gravity, 25/25° C. | 1.29 |
| Beta Resin, wt. % | 17.8 |

Alternatively, a mesophase pitch having mesophase content in the range of 70% to 100%, and preferably in the range of 75% to 85%, may be produced from the distillate by heat treating the distillate at temperatures between 370° C. and 595° C. for between 3 and 40 hours. The yield of the mesophase pitch is generally in the range of 70% and 100%. The mesophase pitch may be used in carbon fibers, lithium-ion batteries and graphite foam.

Alternatively, according to an alternate embodiment of the present invention, a hydrocarbon mixture, such as a mixture of coal tar pitch and petroleum pitch, may be used as a feed material in place of the feed coal tar pitch. The hydrocarbon mixture in this embodiment preferably has a coal tar pitch content of at least 50%.

Carbon/Graphite Products

The present invention also relates to applications of the output coal tar pitch having a high softening point. In a first application, output coal tar pitch having a high softening point in the preferred range of 150° C.-250° C., more preferably in the range of 160° C.-220° C., and most preferably in the range of 170° C.-200° C. is used as a "modifier" in the formation of carbon/graphite products which are traditionally formed from coke an 110° C. softening point coal tar pitch. One embodiment of the present invention involves substituting the 110° C. softening pint coal tar pitch with 160° C. softening point coal tar pitch in the production of the carbon/graphite products. In another embodiment, the output coal tar pitch having a high softening point is used as a substitute for a portion of the coke in the production of the carbon/graphite products.

EXAMPLE 6

Pitch having a softening point of 160° C. is used as a replacement for 110° C. pitch in the extrusion of 5/16" diameter×12" long gouging rods. The pitch is mixed with coke at a pitching level of approximately 60% by weight and extruded to form the finished piece. The products are baked and graphitized. The properties of these products are set forth in Table VII.

TABLE VII

Graphite Properties - Extrusion Process

|  | 110° C. SP Pitch | 160° C. SP Pitch | % Change |
|---|---|---|---|
| Baked Density g/cc | 1.57 | 1.64 | +4.5 |
| Baked Flex Strength psi | 5,042 | 6,562 | +30 |
| Graphite Density g/cc | 1.59 | 1.65 | +3.8 |
| Graphite Flex Strength psi | 3,937 | 5,901 | +50 |
| Graphite Resistivity ohm-ins. | 0.00056 | 0.00048 | −14.3 |
| Scrap | 4.2% | 3.0% | −28.6 |

The carbon and graphite products produced had improved density, strength, and resistivity properties using the 160° C. high softening point pitch over the typical 110° C. pitch. The density of the graphite improved 3.8%, the graphite strength improved 14.3%.

The use of 180° C. softening point pitch as a replacement for coke flour in 1⅝" diameter×24" long and 1⅝" diameter× 48" long graphite pieces. In the formulation, 10 wt. % of the coke flour is removed and 15 wt. % of 180° C. pitch is added as a milled solid to the mix. The products are baked and graphitized. The properties of these products are set forth in Table VIII.

TABLE VIII

Graphite Properties - Using 180° C. Pitch to replace coke

|  | Control | 180° C. SP Pitch | % Change |
|---|---|---|---|
| Density g/cc | 1.71 | 1.79 | +4.7 |
| Resistivity ohm-ins. | 0.00045 | 0.00042 | −6.7 |

The carbon and graphite products produced had improved density, and resistivity properties using the 180° C. high softening point pitch over the typical coke The density of the graphite improved 4.7%, the resistivity improved 6.7%.

Friction Materials

In a second application, the output coal tar pitch is used in the formation of friction materials, in the brakes of various kinds of vehicles such as aircraft and automobiles.

In the formation of semi-metallic automobile brakes, coal tar pitch having a high softening point in the preferred range of 150° C.-250° C., more preferably in the range of 170° C.-240° C., and most preferably in the range of 180° C.-230° C. is used as a binder. It is preferred to use a crosslinking additive to further increase the softening point of the pitch during post cure with temperatures in the range of 350° F. to 450° F.

EXAMPLE 7

The 180° C. softening point coal tar pitch can be used as a replacement for 3 wt. % of a total 8 wt. % phenolic resin in a semi-metallic automobile brake pad.

TABLE IX

A typical (control) semi-metallic automobile brake pad formulation as follows:

| 34 wt. % | Steel Fiber |
| 25 wt. % | Sponge Iron |
| 15 wt. % | Graphite |
| 5 wt. % | Petroleum Coke |
| 8 wt. % | Phenolic Resin |
| 6 wt. % | Filler |
| 3 wt. % | Friction Polymer |
| 3 wt. % | Magnesium Oxide |
| 1 wt. % | Alumina |

Mixing 3 wt. % of the 8 wt. % of phenolic resin is removed and 3 wt. % of 180° C. softening point coal tar pitch that has been milled to 50% through 200 mesh is added in its place and then mixed at ambient temperature.

TABLE X

A semi-metallic automobile brake pad formulation according to this example has the following composition:

| 34 wt. % | Steel Fiber |
| 25 wt. % | Sponge Iron |
| 15 wt. % | Graphite |
| 5 wt. % | Petroleum Coke |
| 5 wt. % | Phenolic Resin |
| 6 wt. % | Filler |
| 3 wt. % | Friction Polymer |
| 3 wt. % | Magnesium Oxide |
| 1 wt. % | Alumina |
| 3 wt. % | 180° C. softening point coal tar pitch |

The semi-metallic brake mixture is molded at 280° F. at a pressure of 3.5-4.0 tons/sq.in. The pressure is released at 45 sec., 90 sec., 135 sec., and 180 sec. to vent the mold. The total time for the mold cycle is 5 minutes. The brake pad is then post cured for 4 hours at 350° F. The properties of the composition are presented in Table XI.

TABLE XI

|  |  | Control | With 180° C. Softening Point Pitch | % Change |
|---|---|---|---|---|
| Wear |  |  |  |  |
| Friction | mm | 1.27 | 1.19 |  |
|  | 315° C. | 0.24 | 0.28 |  |
|  | 425° C. | 1.26 | 0.51 |  |
|  | TOTAL: | 2.77 | 1.97 | −29%[1] |
|  | grams | 23 | 22 |  |
|  | 315° C. | 4 | 4 |  |
|  | 425° C. | 22 | 11 |  |
|  | TOTAL | 49 | 37 | −24%[2] |
| Rotor | mm | −0.015 | −0.011 |  |
|  |  | −0.011 | 0.003 |  |

TABLE XI-continued

|  |  | Control | With 180° C. Softening Point Pitch | % Change |
|---|---|---|---|---|
|  |  | 0.012 | −0.033 |  |
|  | TOTAL | −0.014 | −0.014 |  |
|  | grams | −2 | −2 |  |
| Rotor Surface | Initial | 1.21 | 1.6 |  |
|  | Final | 3.73 | 1.63 |  |
|  | Increase | 2.52 | 0.03 |  |
| Friction |  |  |  |  |
| Overall Rated Average |  | 0.196 | 0.203 |  |
| Post Burnish Ramps Average |  | 0.225 | 0.222 |  |
| All Rated Ramps Average |  | 0.208 | 0.210 |  |
|  |  |  |  | +7.5%[3] |
| Fade Heating Cycle Minimum |  | 0.160 | 0.172 |  |
| All Others Minimum |  | 0.140 | 0.146 |  |
| 315° C. Wear - Final μ |  | 0.185 | 0.199 |  |
| 425° C. Wear - Final μ |  | 0.140 | 0.205 |  |
| EFFECTIVENESS |  |  |  |  |
| Pre Burnish Effectiveness |  |  |  |  |
| 50 kph average |  | 0.249 | 0.241 |  |
| 100 kph average |  | 0.185 | 0.146 |  |
| Post Burnish Effectiveness |  |  |  |  |
| 50 kph average |  | 0.223 | 0.208 |  |
| 100 kph average |  | 0.228 | 0.235 | Stability |
| Post Fade Effectiveness |  |  |  |  |
| 50 kph average |  | 0.199 | 0.200 |  |
| 100 kph average |  | 0.213 | 0.219 |  |
| 130 kph average |  | 0.213 | 0.226 |  |
| Post 425° C. Effectiveness |  |  |  |  |
| 50 kph average |  | 0.187 | 0.200 |  |
| 100 kph average |  | 0.183 | 0.213 |  |

As shown in Table XI, the results show improved wear, especially high temperature wear (425° C.), using coal tar pitch (1), (2) Both as a thickness loss (mm) and weight loss (grams), the wear is reduced by 29% and 24% in the present example as compared to the control formulation (non-pitch containing). (3) The Fade Heating Cycle Minimum is improved by 7.5% using the coal tar pitch of the present invention. A more stable coefficient of friction as the brake pad is tested over the range of energy conditions results when coal tar pitch is used compared to the control formulation. This is shown in the table under Effectiveness with the values indicated.

In the formation of aircraft brakes coal tar pitch having a high softening point in the preferred range of 160° C.-240° C., more preferably in the range of 170° C.-220° C., and most preferably in the range of 180° C.-200° C. is used in the saturation of carbon fiber preforms for aircraft brakes.

EXAMPLE 8

A low QI (Quinoline Insoluble) 180° C. softening point coal tar pitch can be used to saturate aircraft brake carbon fiber preforms to reduce the porosity of the preform from 75 vol. % to 5 vol. % in the following manner.

A carbon fiber preform with approximately 25 vol. % carbon fibers is placed under vacuum (<10 mmHg) and heated to 325° C. Low QI (<10 wt. %) 180° C. softening point coal tar pitch at 325° C. is introduced into the carbon fiber preform. The coal tar pitch saturated carbon fiber preform is pressurized with nitrogen at 15 psig. The saturated carbon fiber preform is cooled. The saturated carbon fiber preform is further processed by the initiation of densification steps using Chemical Vapor Infiltration (CVI).

By saturating the carbon fiber preform with coal tar pitch to raise the initial density of the carbon fiber preform before CVI, the hours of actual CVI required to reach density specification is greatly reduced (by as much as 30%) as shown in FIG. 1. This provides a significant cost benefit to the processing of the carbon fiber preform to produce an aircraft brake disk.

Rubber Products:

In an additional application of the present invention, coal tar pitch having a high softening point in the preferred range of 100° C.-200° C., more preferably in the range of 120° C.-180° C., and most preferably in the range of 140° C.-180° C. is used in the production of rubber products such as tire compounds with natural rubber in the formulation.

EXAMPLE 9

The addition of 6 parts of 140° C. softening point coal tar pitch to a Wire Belt-Coat Compound formulation with 0.5 parts additional sulfur.

TABLE XII

A typical Wire Belt-Coat Compound formulation (control compound) consists of the following:

| 100 parts | Natural Rubber |
|---|---|
| 55 parts | Carbon Black |
| 15 parts | Silica |
| 4 parts | Paraffinic Oil |
| 2 parts | Stearic Acid |
| 6 parts | Zinc Oxide |
| 1 part | Antiox., TMQ |
| 0.75 parts | Cobalt Napthenate |
| 3 parts | Resorcinol |
| 2.5 parts | HMMM |
| 4.0 parts | Sulfur |
| 0.9 parts | TBSI |

From the Wire Belt-Coat Compound formulation, the Resorcinol and HMMM are removed and 6 parts of 140° C. softening point coal tar pitch that has been milled to 50% through 200 mesh and 0.5 parts of additional sulfur is added.

TABLE XIII

A Wire Belt-Coat Compound formulation according to the present example (Coal Tar Pitch Compound) consists of the following:

| 100 parts | Natural Rubber |
|---|---|
| 55 parts | Carbon Black |
| 15 parts | Silica |
| 4 parts | Paraffinic Oil |
| 2 parts | Stearic Acid |
| 6 parts | Zinc Oxide |
| 1 part | Antiox., TMQ |
| 0.75 parts | Cobalt Napthenate |
| 4.5 parts | Sulfur |

TABLE XIII-continued

A Wire Belt-Coat Compound formulation according to the present example (Coal Tar Pitch Compound) consists of the following:

| | |
|---|---|
| 0.9 parts | TBSI |
| 6 part | 140° C. softening point coal tar pitch |

The formulation was prepared as follows:

Stage 1

Starting Temperature, ° F.: 150-160 Rotor Speed, rpm: 70
Ram Pressure, psi: 50

| Time, Minutes | Ingredient or Procedure |
|---|---|
| 0 | ½ Rubber, Silica, ½ Carbon Black, ½ Rubber |
| 1¾ | All except TBSI, Zinc Oxide, HMMM, Sulfur |
| 3½ | Sweep |
| 5 | Sweep |
| 6 | Dump |

Set mill rolls temperature at 130° F. Band Stage I mix.
Cut three times each side, three end passes, sheet to cool.

Stage II

Starting Temperature, ° F.: 100-110 Rotor Speed, rpm: 60
Ram Pressure, psi: 50

| Time, Minutes | Ingredient or Procedure |
|---|---|
| 0 | ½ Stage I, TBSI, Sulfur, HMMM, ZnO, ½ Stage I |
| 1 | Sweep |
| 2½ | Dump |

Set Mill rolls temperature at 130° F. Band Stage II mix.
Five cuts each side, five end passes, set grain for two minutes, sheet to cool.

Compounds rested for 24 hours at 72° F. before testing and curing.

The properties of the Wire Belt-Coat Compound using the coal tar pitch formulation is set forth in Table V.

TABLE XIV

| Test | Control Compound | Coal Tar Pitch Compound |
|---|---|---|
| Rheometer Data, ASTM D 2084-95 | | |
| Max. Torque, $M_H$ lbf-in. | 125.0 | 82.6 |
| Min. Torque, $M_L$ lbf-in. | 22.4 | 23.1 |
| Scorch Time, $t_s2$, min. | 2.3 | 2.9 |
| Cure Time, $t_{50}$, min. | 7.3 | 7.2 |
| Cure Time, t90, min. | 19.1 | 13.0 |
| Mooney Viscosity, ASTM D1646-98a | | |
| Initial Viscosity, MU | 135.0 | 131.7 |
| Viscosity @ 4 min., MU | 93.2 | 98.1 |
| Cure/Mold Data, ASTM D 3182-94 | | |
| Test Plaques | 31 | 28 |
| Rubber Adhesion | 40 | 35 |
| DeMattia Flex | 40 | 35 |
| Physical Properties, ASTM D 412-98a, D 2240-00- | | |
| Shore A Durometer, points | 88 | 75 |
| Tensile Strength, psi | 2820 | 3050 |
| Ultimate Elongation, % | 230 | 530 |
| 100% Modulus, psi | 1200 | 440 |
| 300% Modulus, psi | — | 1550 |
| Heat-Aged Properties ASTM D573-99 | | |
| Shore A Durometer, points | 89 | 79 |
| Tensile Strength, psi | 1710 | 2770 |
| Ultimate Elongation % | 120 | 420 |
| 100% Modulus, psi | 1460 | 690 |
| 300% Modulus, psi | — | 2120 |
| Wire Adhesion, ASTM D 2229-99 | | |
| Unaged | | |
| Adhesion, lbs./force | 182 | 160 |
| Rubber Coverage, % | 100 | 75 |
| Aged | | |
| Adhesion, lbs./force | 106 | 118 |
| Rubber Coverage, % | 80 | 75 |
| Demattia Flex, ASTM D 813-95(00) | 1,000 cycles | 10,000 cycles (1) |
| Rubber to Rubber Adhesion, ASTM D 413 | | |
| At Room Temp. Adhesion, ppi | 78 | 249 (2) |
| At 212° F. °Adhesions, ppi°° | 63 | 291 |

The tests show the coal tar pitch containing compound to have (1) improved Demattia Flexibility results, (2) improved Rubber to Rubber Adhesion, and improved Heat Aged properties over the properties of the non-pitch containing control compound.

Mesophase Pitch:

Further, another presently preferred embodiment of the present invention broadly contemplates distillate used to make mesophase pitch.

During the preparation of high softening point (SP) pitches (140 to 240° C. SP), a distillate fraction (overhead) is also produced. The overhead contains <0.1 wt % quinoline insolubles (QI) and <1 wt % toluene insolubles (TI). The material contains mostly aromatic hydrocarbons boiling above 250° C. (most boiling above 380° C.). Because of its aromatic nature and lack of solids (QI), overhead can be converted to mesophase under the proper treatment conditions. Mesophase is usually defined as an optically anisotropic liquid crystal carbonaceous phase or pitch which forms from the overhead under proper conditions. Mesophase pitch can be used in specialty applications such as carbon/carbon composites, lithium batteries, heat management devices, foams, and mesocarbon beads.

Mesophase can be prepared in concentrations of <1 vol % to over 80 vol % by various thermal treatment methods.

EXAMPLE 10

Approximately 500 g of overhead was thermally treated at 400° in a 500-ml glass reactor under a nitrogen atmosphere sweep of 750 cc/min. After 40 hours, the mesophase content was 0.9 vol % and increased to 46.0 wt % after 68 hours.

EXAMPLE 11

In an apparatus similar to one used in Example 1, overhead was treated at 440° C. After 35 hours, the mesophase content was 80.2 vol %.

EXAMPLE 12

The overhead was first distilled to a 107° C. SP pitch by vacuum distillation with some heat treatment during distillation. The resultant pitch (1.1 vol % mesophase) was then heat treated in a 20-ml covered crucible at 450° C. for 2 hours. The mesophase content was 76.6 vol %. Treatment of the pitch in the crucible at 430° C. for 3 hours produced a mesophase content of 15.8 vol %. These tests were conducted in an oven with no nitrogen purge.

EXAMPLE 13

The overhead was treated in a 100-ml glass reactor at 430° C. for 15, 17, and 19 hours; the mesophase content was 6.9, 35.3, and 81.8 vol %, respectively. Nitrogen was swept over the material being treated at a rate of 450 cc/min.

EXAMPLE 14

The overhead was vacuum distilled with no heat treatment to a soft pitch (54.0° C. SP). The soft pitch was then heat treated in the 100-ml glass reactor with nitrogen purge. After 39 hours at 400° C. the mesophase was 3.9 vol %. The soft pitch was also heat treated for 31 hours at temperatures ranging from 430 to 455° C. for a total of 31 hours; the mesophase content was 82.4 vol %.

EXAMPLE 15

The overhead was heat treated at 440° C. in the 100-ml glass reactor, however, 5% oxygen was added to the purge gas. After 8 hours, the mesophase content was 19.8 vol %. The nature of the mesophase was changed by the presence of oxygen; the small mesophase spheres were prevented from coalescing to larger spheres or mosaic structures. The 10-μm spheres retained their individuality.

EXAMPLE 16

A larger quantity (about 2 Kg) of mesophase material was prepared in a 4-liter glass reactor with nitrogen purge. The overhead was heat treated for 36 hours at temperatures ranging from 410 to 440° C. The mesophase content of the product was 28.8 vol %.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. A method of making a mesophase pitch comprising:
   feeding a coal tar pitch having a softening point in the range of about 70° C. to 160° C. into a processing vessel, wherein the processing vessel is heated to a temperature in the range of about 300° C. to 450° C. and wherein the pressure inside the processing vessel is 5 Torr or less;
   obtaining a distillate from said processing vessel, said distillate having a softening point in the range of about 40° C. to 80° C. and being quinoline insoluble free and ash free;
   heat treating said distillate at a temperature range of 400° C. to 455° C. for between 3 and 8 hours.

* * * * *